UNITED STATES PATENT OFFICE.

LUDWIG BEREND, OF WIESBADEN, GERMANY.

PROCESS OF PREPARING CONDENSATES FROM CASEIN, PHENOLS, AND FORMIC ALDEHYDE AND THE PRODUCT OBTAINED THEREBY.

1,040,850.      Specification of Letters Patent.      Patented Oct. 8, 1912.

No Drawing.      Application filed July 15, 1911. Serial No. 638,780.

*To all whom it may concern:*

Be it known that I, LUDWIG BEREND, a subject of the Emperor of Germany, residing at Wiesbaden, Germany, have invented certain new and useful Improvements in Processes of Preparing Condensates from Casein, Phenols, and Formic Aldehyde and the Product Obtained Thereby, of which the following is a specification.

It is known that casein, as well as phenols, yields with formic aldehyde hard, plastic masses which may be used for widely varying purposes. All of these classes are, however, very brittle, and besides, the casein products gradually swell in water; while bodies obtained from phenol and formic aldehyde are not plastic and consequently cannot be molded. All of these drawbacks are obviated by the present process which is very simple and easy of effecting both as to managing the reaction of the materials as well as working the final products obtained from the reaction. The final products have, even when finished, considerable plasticity and are extremely resistant to mechanical and chemical influences.

Contrary to similar processes, the manufacture of the products according to the present invention may be carried out by means of a single operation without any separation and cleaning, and the raw materials employed take part in the reaction. The product obtained according to the present process is free of odor, and even when worked while being heated has no odor of phenol whatever. As the products obtained are more or less hard according to the proportions of casein and phenol employed, the process allows the imitation of various natural products, such as horn, celluloid, hard rubber, amber and the like, which possibility is not afforded by the condensates of phenol and formic aldehyde. Besides, the toughness of the products obtained according to the present process is much greater and the brittleness much less than the condensates of phenol and formic aldehyde, so that the masses may be worked without any difficulty.

Starting from a solution of casein or alkaline casein in phenol, the mixture is caused to boil, and afterward, a solution of formic aldehyde or a body such as trioxymethylene which is adapted to easily form formic aldehyde, is gradually added. The reaction which ensues takes place quietly and in an uniform manner, and soon afterward the mass begins to become semi-fluid, remaining in a thick liquid state while heated and solidifying when cooled. When the aqueous formic aldehyde of commerce is used, the product is obtained as a precipitate by treating the mass with acid after the condensation is terminated, and the rosin-like product obtained is boiled in water until the reaction is neutral. The condensate obtained by either the former or the latter method is softened by the application of heat, and, if required filling materials may be added thereto, whereafter, the mass may be formed into the hard and solid final products. The material is preferably formed into the final products in molds, while pressure is applied at the same time.

The manufacture of the product according to the present invention may advantageously be also carried out in the following manner: Casein is added to an equal quantity of phenol and about 2 per cent. of alkali, and the whole is stirred into a thick paste. Then a further amount of phenol is added, and the mixture is slowly heated to about 100° C. About one-third of the amount of trioxymethylene to be employed is then stirred into the mass, and the application of heat is withdrawn until the reaction takes place. When the reaction is finished another third part of the trioxymethylene is added, and after the termination of the reaction which ensues, the remainder of the trioxymethylene is added. The heat is then increased so that the temperature of the materials is raised, but the temperature should not be above 110° C., at about which figure it should be maintained for about two hours. If, at the end of this length of time, a test sample which is taken out should solidify when cooled, the chemical treatment of the mass is then completed, and it can be worked in an open vessel provided with a kneading device, or it can be treated with filling materials in the same manner as masses of celluloid, and can thereafter be formed into the desired shape. The mass taken out of the condensing vessel and which solidifies in the cold, can also be introduced directly, with or without filling materials, into molds, where it is hardened by heating it during a certain length of time, firstly, for about six hours at a temperature of 100–110° C., and then for a few hours at a slightly higher temperature. Exactly the same result may be obtained however, by heating the mass to temperatures of 80–100° C. for from twelve to twenty hours.

That the phenol-casein derivative is really a true chemical compound would appear from the fact that from the product of condensation first obtained, a thoroughly homogeneous rosin-like substance, very similar to bleached shellac, can be separated by means of acid without the presence of free casein. This substance can be employed as a substitute for shellac. When effecting the present process, other members of the phenol series may be employed instead of phenol proper.

Example: Twenty-five grams of casein are intimately stirred with twenty-five grams of phenol and two grams of caustic soda lye, and the mixture is heated until a clear, viscous solution is obtained. Then fifty grams of phenol and ten grams of trioxymethylene are added, the mixture is slowly heated to 100° C. and reaction takes place. Then ten grams more of trioxymethylene are added, the mass is heated until reaction takes place, then slightly cooled, and finally five grams of trioxymethylene are gradually added. The mixture is thereafter cautiously heated, and is maintained at a gentle ebullition for a period of about two hours, until a test sample which is taken out is found to solidify upon cooling in the air. The remaining treatment of the mass follows as above described.

I claim:

1. The process of producing a condensation product of casein, a phenol, and formaldehyde which comprises condensing a solution of casein in a phenol with a formaldehyde-yielding substance.

2. The process of producing a condensation product of casein, a phenol, and formaldehyde which comprises dissolving a casein in a phenol, and condensing the resulting solution with formaldehyde.

3. The process of producing a condensation product of casein, a phenol and formaldehyde which comprises heating a mixture of casein, a phenol, and an alkali until a clear solution is obtained, and condensing the resulting solution with a formaldehyde-yielding substance.

4. The process of producing a condensation product of casein, phenol and formaldehyde which comprises dissolving a casein substance in a phenol, condensing such solution with a formaldehyde-yielding substance until a rosin-like condensation product is obtained, and purifying the resulting product by boiling with water.

5. As a new product a condensation product of casein, a phenol and formaldehyde free from uncombined casein.

6. As a new product a condensation product of casein, a phenol and formaldehyde, in the form of a rosin-like mass similar to bleached shellac, and free from uncombined casein.

In testimony whereof I have hereunto set my hand in presence of two witnesses.

LUDWIG BEREND.

Witnesses:
HERMAN PLISCHER,
MARIA MENKE.